US006993574B2

(12) United States Patent
Hall

(10) Patent No.: US 6,993,574 B2
(45) Date of Patent: Jan. 31, 2006

(54) WEB-BASED COMMUNICATIONS ADDRESSING SYSTEM AND METHOD

(75) Inventor: Robert Hall, Berkeley Heights, NJ (US)

(73) Assignee: Zoetics, Inc., New York, NY (US)

( * ) Notice: Subject to any disclaimer, the term of this patent is extended or adjusted under 35 U.S.C. 154(b) by 612 days.

(21) Appl. No.: 09/884,646

(22) Filed: Jun. 19, 2001

(65) Prior Publication Data

US 2002/0194308 A1 Dec. 19, 2002

(51) Int. Cl.
*G06F 15/16* (2006.01)

(52) U.S. Cl. ....................................... 709/219; 709/207

(58) Field of Classification Search ........ 709/206–207, 709/223–225, 217–219

See application file for complete search history.

(56) References Cited

U.S. PATENT DOCUMENTS 5,555,346 A 9/1996 Gross et al.
5,627,764 A 5/1997 Schutzman et al.
5,930,479 A 7/1999 Hall
5,999,967 A * 12/1999 Sundsted .................... 709/206
6,185,551 B1 * 2/2001 Birrell et al. .................. 707/3
6,266,692 B1 * 7/2001 Greenstein .................. 709/206
6,546,416 B1 * 4/2003 Kirsch ........................ 709/206
6,760,752 B1 * 7/2004 Liu et al. .................... 709/206

* cited by examiner

*Primary Examiner*—Dung C. Dinh
*Assistant Examiner*—Victor Lesniewski
(74) *Attorney, Agent, or Firm*—David C. Jenkins; Eckert Seamans Cherin & Mellott, LLC

(57) ABSTRACT

A system and method is provided for sending and receiving authorized messages from a sender to a recipient in a network utilizing a Web-based mail server. The Web-based mail server communicates with a user via HTML or another general purpose language. The mail system makes use of a channelized address to send the message from the sender to the recipient. The channelized address comprises a common address portion that indicates the identity of the recipient in the network and a channel identifier portion for verifying that the message is authorized for delivery to the recipient.

2 Claims, 11 Drawing Sheets

*FIG. 3*

PRIOR ART

| CORRESPONDENT ADDRESS (302) | OWN CHANNEL (304) | CORRESPONDENT CHANNEL (306) | OWN KEY (308) | CORRESPONDENT KEY (310) |
|---|---|---|---|---|
| frobboz@geewhiz.com | 1QXR7112PH | 1DDYWA7H7I | X9GWAAH4T | T7AA18MMN |
| jrandom@j.r.isp.net | 122PG3LWAW | 1CJX449HKV | ADWKBSA92 | |
| ------------ | 2AA47WX3BQ | ---------- | --------- | ---------- |
| ------------ | 2BZZ86A9FC | ---------- | --------- | ---------- |
| | ⋮ | | | |
| info-hooha@sri.com | 0XTRR9Y680 | ---------- | BZTGRTKI3 | ---------- |
| | ⋮ | | | |

*FIG. 4*

PRIOR ART

| OPEN CHANNEL |
|---|
| 1QXR7112PH |
| 2AA47WX3BQ |
| 122PGLWAW |
| ⋮ |
| 2BZZ86A9FC |

401

WEB-BASED COMMUNICATIONS ADDRESSING SYSTEM AND METHOD

FIELD OF THE INVENTION

The present invention relates generally to communications sent over a communications network, and more particularly, to a Web-based system and method for controlling the reception of communications from various entities having access to the network.

BACKGROUND OF THE INVENTION

Electronic mail ("e-mail") has become increasingly popular as a form of communication in today's society. This is due at least in part to the popularity of the Internet. Users of e-mail may be referred to as "users." The user is generally referred to as a "recipient" when receiving e-mail and as a "sender" when sending e-mail to a recipient. The term "correspondent" may be used to refer to a person or persons who are sending e-mail to, or receiving e-mail from, the user in question.

To send e-mail over a communications network, a user must address an e-mail message to an intended recipient. For example, referring to FIG. 1A, a conventional e-mail address as used on the Internet is illustrated. The address usually has two parts, the user name 100 (also referred to as the "mailbox name") and the host (or domain) name 102. These two parts are part of a hierarchy of names; that is, the domain name 102 is of a higher level than the user name 100. The user name 100 may be described as the lowest-level name in the hierarchy. Typically, the user name 100 and the host name 102 may be separated by an "at" sign, "@", 104. To send e-mail over the Internet, the user addresses the e-mail message by placing the intended recipients' addresses in the "To" line (or field) of the message as is well know in the art. In addition, a user may "carbon copy" or "cc" (or "Cc") yet another intended recipient of the e-mail message by placing that recipient's address in the cc line (or field) as is also well known in the art. There is also typically a "from" line (or field) indicating who sent the message. All of these items together with non-address portions such as subject, date, etc., form what is known as a "header" of the e-mail message. Other options, also well known in the art, are available for various ways to address intended recipients of Internet e-mail. Analogous methods exist for addressing e-mail over other networks.

Unfortunately, as with other forms of communication, for example regular mail and facsimile, users of e-mail may receive a quantity of unwanted or "junk" mail. This may be in the form of "telemarketing" type e-mail (for example an advertisement or a survey). While this may only rise to the level of a mere nuisance or annoyance, in some situations, unwanted e-mail may actually rise to the level of harassment. For example, the user may receive unwanted offensive or obscene e-mail. A malicious e-mail sender could also possibly send "hate mail".

This type of activity, in some circumstances, may as a practical matter render the user's e-mail capabilities useless. For example, if a malicious e-mail sender barraged the e-mail user's mail box with a multitude of messages that the user would have to review, any wanted, or "non-junk" mail would be buried in a large amount of useless junk e-mail. The malicious e-mail sender could also send messages that were known to offend the recipient so that the recipient would not want to review any of the messages received, including legitimate messages.

The commercialization of the Internet further threatens the usefulness of e-mail. Today, it is easier than in the past to collect address lists and inexpensive to mass distribute messages. Every time a user sends a message to a public newsgroup or list, fills out a Web form, or mails in a product registration card, the server inexpensively obtains an e-mail address and typically some indication of the user's interests. This information can then be sold to marketing firms who can easily automate unsolicited mass e-mailings of advertisements, surveys, and other annoyances that may cost the user connect time and, possibly worse, valuable attention span.

It is desirable to be capable of restricting the receipt of unwanted e-mail and other types of messages sent over a network. In addition, when unwanted e-mail (or messages) is received, it is beneficial to be able to determine in what manner the sender of the unwanted e-mail obtained the user's address.

In U.S. Pat. No. 5,930,479 ("the '479 patent"), issued Jul. 27, 1999, the disclosure of which is hereby incorporated by reference in its entirety herein, I disclose a method and system for sending messages utilizing "channelized addresses" to create different "channels" that correspondents can use to send e-mail to the user. In other words, each user's e-mail account is made accessible via a user-controlled set of channels. Each channel has a distinct structured e-mail address that contains within it the account name and a "channel identifier." Each legitimate correspondent is allowed to know one or more of these access addresses or channel identifiers.

The system described in the '479 patent allows the user to reject any e-mail not arriving on a proper channel (with a proper channelized address). If unwanted e-mail does arrive on a valid channel, the user may turn the channel off and allow legitimate users of that channel to use another channel. In other words, legitimate users are "switched" to another channel.

The user (or account owner) is provided simple controls for opening a new channel, closing a channel (hence possibly retracting one or more correspondent's access privilege), and switching a channel (notifying selected correspondents that the current channel is being closed, but a new one is open for their use). This can be provided through an automated personal channel agent or administrator ("PCA"). The PCA also causes the received channelized e-mail to look and feel to the user exactly like conventional e-mail. The PCA provides various administrative controls. The PCA manages a database that maps a correspondent's address to its assigned channel, as well as (when applicable) the channel assigned by the correspondent to the account owner.

Referring to FIG. 1B, a "channelized address" 106 according to a preferred embodiment is shown. This address is in the standard Internet domain name format. This format usually consists of a hierarchy of names, the domain name being of a higher level and the user name being of a lower level in the hierarchy.

The channelized address 106 in FIG. 1B comprises at least three basic parts, the user name 108, the channel identifier (or channel ID) 110, and the host (or domain) name 112. Between the channel ID 110 and the host name 112 is an "at" sign, "@", 104. As shown in FIG. 1B, there is a hyphen ("-") immediately before and immediately after the channel ID 110. By comparison of FIG. 1A with FIG. 1B, it should be noticed that the conventional address (FIG. 1A) is somewhat similar in appearance to the channelized address (FIG. 1B), except that the channelized address contains the channel ID 110 to the left of the "at" sign 104. Thus, the channelized address 106 contains both traditional address information (e.g., user name 108 and host name 112), as well as the channel ID 110.

The channel ID includes a security string that is practically unguessable (or even random) even when a malicious email sender (or adversary) is aware of several of the user's other preexisting channel identifiers. That is, the channel identifier should be unpredictable by an adversary. The security string may be generated pseudorandomly, may be generated randomly or may be selected by a user. The important point is that the security string be practically unguessable by an adversary, no matter how it is generated.

The administration of the channelized addresses 106 and the generation of the channel ID 110 are accomplished by the PCA, which is described below in more detail with respect to other functions it performs.

A user of the system described in the '479 patent may allocate a number of the channelized addresses 106 having differing channel identifiers 110 for different correspondents. Other than the channel ID portion of the channelized address, the address may look the same for all correspondents. If a correspondent desires to send e-mail to the user, the correspondent must send the e-mail identifying the correct channel; that is, by using an open (or active) channelized address 106 with the proper channel identifier 110. If the correspondent sends to a channel that has not been opened or that has been closed as is described below, the e-mail from the correspondent will be rejected by the user's mail server and the user will never receive it. A goal is thus to control access to a user's mailbox by potential correspondents, not to ensure anonymity of the account owner/user, or to guarantee privacy of the messages.

FIG. 2 illustrates the architecture of the system described in the '479 patent. The hardware involved is connected to a network 200, such as the Internet, for sending e-mail to correspondents and receiving e-mail from correspondents. Connected to the network 200 is a mail server 202. The server 202 is connected to a personal channel agent host ("PCA host") 204, which is a computer that acts as a host machine for the personal channel agent ("PCA") 214. The PCA host 204 is connected to a user machine 206. The user machine acts as the user interface to the network 200 for sending and receiving e-mail.

Within the mail server 202 is a mail receiver 208 and a mail sender 210. The mail receiver 208 and mail sender 210 can be implemented using a modified form of the Unix "Sendmail" program. In particular, the Sendmail program is modified to reject messages addressed to closed channels. The mail receiver 208 is a "daemon" program. In other words, the mail receiver 208 constantly checks to determine whether any mail has arrived from the network 200. Preferably, the mail receiver 208 receives e-mail from the network 200 on path 220 using the Simple Mail Transfer Protocol ("SMTP"), although other conventional formats could also be used. The mail sender 210 preferably sends mail to the network 200 on the path 222 using the SMTP protocol, although other conventional formats could also be used. In the SMTP protocol, a message is transmitted with an envelope that specifies the sender and the recipient(s). The message itself comprises header lines (to, from, cc, subject, date, etc.) followed by a blank line followed by the body of the message. The server 202 also contains a channels file 212. The term "file," as used throughout this disclosure, shall include data and dabases stored on permanent or semipermanent media such as a disk, a tape or a ROM device, and shall also include data and databases resident in transient memory.

Within the PCA host 204 is the PCA 214. The PCA 214 receives mail from the mail receiver 208 via path 216. The PCA 214 is configured to periodically check the mail server 202 for new e-mail. Path 216 preferably uses the POP3 protocol to transfer the e-mail from the mail receiver 208 to the PCA 214. The POP3 protocol is enabled by running a software product, such as "POPPER" (which can be obtained from the Internet at ftp.CC.berkeley.edu) on the mail server 202. Other known implementations of the POP3 protocol, as well as other known protocols, could also be used. The PCA 214 also forwards e-mail to the mail sender 210 via path 218. Path 218 preferably uses the SMTP protocol to transfer e-mail from the PCA 214 to the mail sender 210. Other known protocols could also be used on path 218. The PCA 214 also transfers data via path 224 to the channels file 212. This data is transferred using the File Transfer Protocol ("FTP") along path 224. The PCA 214 also has a User Channel Database ("UCDB") 226, which is described below.

Within the user machine 206 is a mail client 228. In a preferred embodiment, the mail client 228 may be implemented with the Netscape Mail Client and Browser available from Netscape Communications Corp. Of course, other well-known mail clients could also be used. The mail client 228 communicates with the PCA 214 via paths 230 and 232. Path 230 is used for receiving e-mail from the PCA 214 using the POP3 protocol. Path 232 is used for sending e-mail from the mail client 228 to the PCA 214 using the SMTP protocol.

Also within the user machine 206 is a Web browser 234. In a preferred embodiment, the Web browser 234 could be implemented with the Netscape Navigator browser provided by Netscape Communications Corp. The Web browser 234 is used to administer the PCA 214 including the UCDB 226. The Web browser 234 communicates with the PCA 214 along path 236 using the Hypertext Transfer Protocol ("HTTP"), although other known protocols may also be used.

Referring to FIG. 2, conceptually, the PCA 214 acts as an e-mail proxy, sitting between the user's mail client 228 and the mail server 202. Thus, all incoming and outgoing messages pass through the PCA 214, which uses appropriate protocols as discussed above to interact with the mail client 228 and mail server 202. This positioning allows the PCA 214 to autonomously perform various bookkeeping functions, thereby shielding the user from them.

The user channel database (UCDB) 226 primarily records two mappings, the channel map and the correspondent address map. The channel map associates each correspondent with the channel on which the user expects to receive mail from that correspondent. The correspondent-address map associates each correspondent's user and host names with the channel ID (if one exists) on which the user is allowed to send to the correspondent.

The UCDB 226 (or 226*a*) is conceptually illustrated in FIG. 3. The headings in each column are not actually stored in the database 226, but are provided in FIG. 3 for illustrative purposes. For each correspondent address 302, the UCDB 226 may have one or more of the following entries: own channel 304, correspondent channel 306, own key 308, and correspondent key 310. A correspondent is simply another e-mail user that the user desires to send to or receive mail from. The correspondent address 302 is the standard e-mail address of the correspondent. The own channel 304 is the channel ID 110 used for the correspondent to send e-mail to the user. The correspondent channel 306 is the channel ID 110 that must be used by the user to send e-mail to the correspondent. The own key 308 is a key assigned by the user that is necessary to allow certain functions to be performed. The correspondent key 310 is a key assigned by the correspondent, which is also necessary to allow certain functions to be performed. All of this information is placed in the UCDB 226 by the PCA 214 as it interacts with the mail server 202 and the user machine 206.

Referring now to FIG. 4, a conceptual diagram of the channels file 212 is illustrated. The heading on the column "Open Channels" is illustrative only, and such a heading is not actually stored in the channels file 212. The channels file 212 has a list of channels 401 that have been opened by the user. Opening channels may be accomplished with a user interface. In the example shown in FIG. 4, the first channel listed is "1QXR7112PH". These channels are checked by the modified Sendmail program when the mail receiver 208 receives a message. The channels file 212 is updated regularly by the PCA 214 from information that has been entered in the UCDB 226. This information is stored in the own channel field 304 of the UCDB, as shown in FIG. 3.

Web-based e-mail services have recently become available for providing a mailbox address and mailbox functions through a server interacting with the client entirely through HTML protocol. Such an arrangement permits an email user to interact with the mail server from any client machine with a browser. Message composition, incoming message display and directory displays are transacted between client and server through HTML pages.

A typical Web-based mail server system, as illustrated in FIG. 5, includes a mail server 504 communicating with a user machine 500 running client software such as browser 501. Communication between the server 504 and user machine 500 is via HTTP protocol 502 transmitted over a network 503 such as the Internet or another public or private computer network.

E-mail messages to recipients (path 551) and from senders (path 550) are transmitted via the network 503 using SMTP protocol or another protocol suitable for mail transfer. Those messages are communicated with the user machine 500 via HTTP protocol through the network 503.

The Web-based mail server 504 contains a mail server portion 506 and a network interface layer 505. The mail server portion 506 includes an incoming message receiver 541 for receiving mail from the network 503, and an outgoing message queue and sender 542 for transmitting outgoing mail. Both the incoming message receiver 541 and outgoing message queue and sender 542 use SMTP protocol in sending and receiving mail messages to and from the network 503. A message store 540 in the mail server portion 506 provides file storage for received messages. The received messages are transferred directly (path 545) to the message store upon receipt.

The network interface layer 505 of the Web-based mail server 504 contains a series of HTML web pages for communicating with the user via browser software on the user machine. For example, the interface layer contains a message composition page 520 that may be presented via HTTP protocol through the network 503 to a user for composing a message. The page contains fields for the address of the message recipient, the subject of the message, message attachments and the message text. To compose a message, a user places information in the HTML fields as necessary and transmits the page with the additional information to the Web-based mail server 504 via HTTP protocol through the network 503. The network interface layer 505 recognizes the information contained in the fields of an incoming message composition page 520, formats the information for transfer via SMTP protocol, and forwards the information (path 525) to the outgoing message queue and sender 542.

Similarly, an in-box page 521 is provided for communication of the contents of the message store 540 to the user via the network 503. Information is transferred via HTTP protocol between the inbox page 521 and the message store 540 via path 544. An in-box page may be transmitted to the user containing, for example, a list of the subject fields, senders and receipt dates for all messages in the in-box file of the message store. Unread messages are typically highlighted in the list to be brought to the user's attention. After a message is read, the user may use administrative controls of the HTML Web pages to delete the message from the message store or move the message from the in-box file to another file within the message store such as a subject matter file.

When a user wishes to read a message from the message store, the user requests that a message display page 522 containing the content of a particular message be transmitted to the user machine. The message contents are retrieved from the message store 540 via path 543 and are placed in appropriate fields of the HTML message display page 522 for transmission to the user machine 500.

In each case, because all information transferred between the user machine 500 and the Web-based mail server 504 utilizes HTTP protocol and is embedded within Web pages readable by a standard browser, no mail client is required at the user machine. Instead, the user may access her mail through any machine having a browser.

SUMMARY OF THE INVENTION

A technical advance is made over the prior art through the system and method of the present invention. A first embodiment of the invention features a server for handling messages transmitted to and from a plurality of clients over a network. The messages have addresses attached to them. The server includes a network interface for communicating with the clients by transferring a markup language using a network protocol, and a mail server for sending and receiving messages over the network. The server also includes a channels assignment manager for assigning channel identifiers to be used as parts of the addresses, and a channel gateway for determining whether messages are authorized messages based upon the channel identifiers.

The network protocol used by the network interface may be a protocol for rendering using a markup language rendering tool. In that case, the markup language rendering tool may be a browser. Furthermore, the network protocol may be HTTP or WAP.

The markup language transferred by the network interface may be XML, HTML, SGML or WML. The server may further include a message store for storing the messages.

The messages received by the mail server from the network may be filtered by the channels gateway before being stored in the message store. In that embodiment, the channel processing server may perform a preliminary function on the messages before they are stored in the message store. That preliminary function may be stripping channel identifiers from the addresses, verifying digital signatures contained in the messages, or decrypting the message.

The server may include a personal channel agent for administering channels. In that embodiment, the network interface may have at least one channel control page for transmission to and from the client allowing the client to access the personal channel agent. The network interface may also include at least one email administration page for transmission to and from said client. The channel control pages and the email administration pages may be transmitted to the client as single markup language pages.

In another embodiment of the invention, a method is provided for presenting a message to a recipient in a network. In this embodiment, the message has an address for sending the message from a sender to the recipient. The address includes a common address portion that indicates the identity of the recipient in the network and a channel identifier portion for verifying that the message is authorized. In the method, information in the message, together with an identification of at least one correspondent from whom messages containing the channel identifier portion of the address are authorized, are transmitted to the recipient for simultaneous display.

That embodiment of the invention may also include a step of providing at least one function for the recipient to manipulate the identification of correspondents. The function may include a function for closing a channel identified by the identifier portion of the address.

The message information and correspondent identification may be transmitted using a markup language. The markup language may be XML, HTML, SGML or WML. The message information and correspondent identification may be transmitted using a network protocol for rendering using a markup language rendering tool. In that case, the markup language rendering tool may be a browser, and the network protocol may be HTTP or WAP. The channel identifier portion may be a substantially unguessable portion of the address.

In yet another embodiment of the invention, a method is provided for authenticating mail sent through a network from a first correspondent to a second correspondent. The method includes assigning a channel identifier for use by the first correspondent in sending messages addressed to the second correspondent. The channel identifier is stored in an open channel database.

A message addressed using a modified address of the second correspondent is then received through the network from the first correspondent. In that message, the address contains the channel identifier identifying the second correspondent in the network. It is then verified that the channel identifier in the modified address is in the open channel database. If so, then information derived from the message and information derived from the open channel database are transmitted though the network to the second correspondent for simultaneous display.

Another embodiment of the invention provides a method for presenting a message to a recipient in a network. The message has an address to send the message from a sender to the recipient. The address includes a common address portion that indicates the identity of the recipient in the network and a channel identifier portion for verifying that the message is authorized for delivery to the recipient. The method includes transmitting to the recipient for simultaneous display, an email administration pane and a channel administration pane.

These and other advantages of the invention will be apparent to those of ordinary skill in the art by reference to the following detailed description and the accompanying drawings.

BRIEF DESCRIPTION OF THE DRAWINGS

FIG. 3 is a diagram illustrating a database used in conjunction with the system shown in FIG. 2;

FIG. 4 is a diagram illustrating a file used in connection with the system shown in FIG. 2;

DETAILED DESCRIPTION

Figure 6:
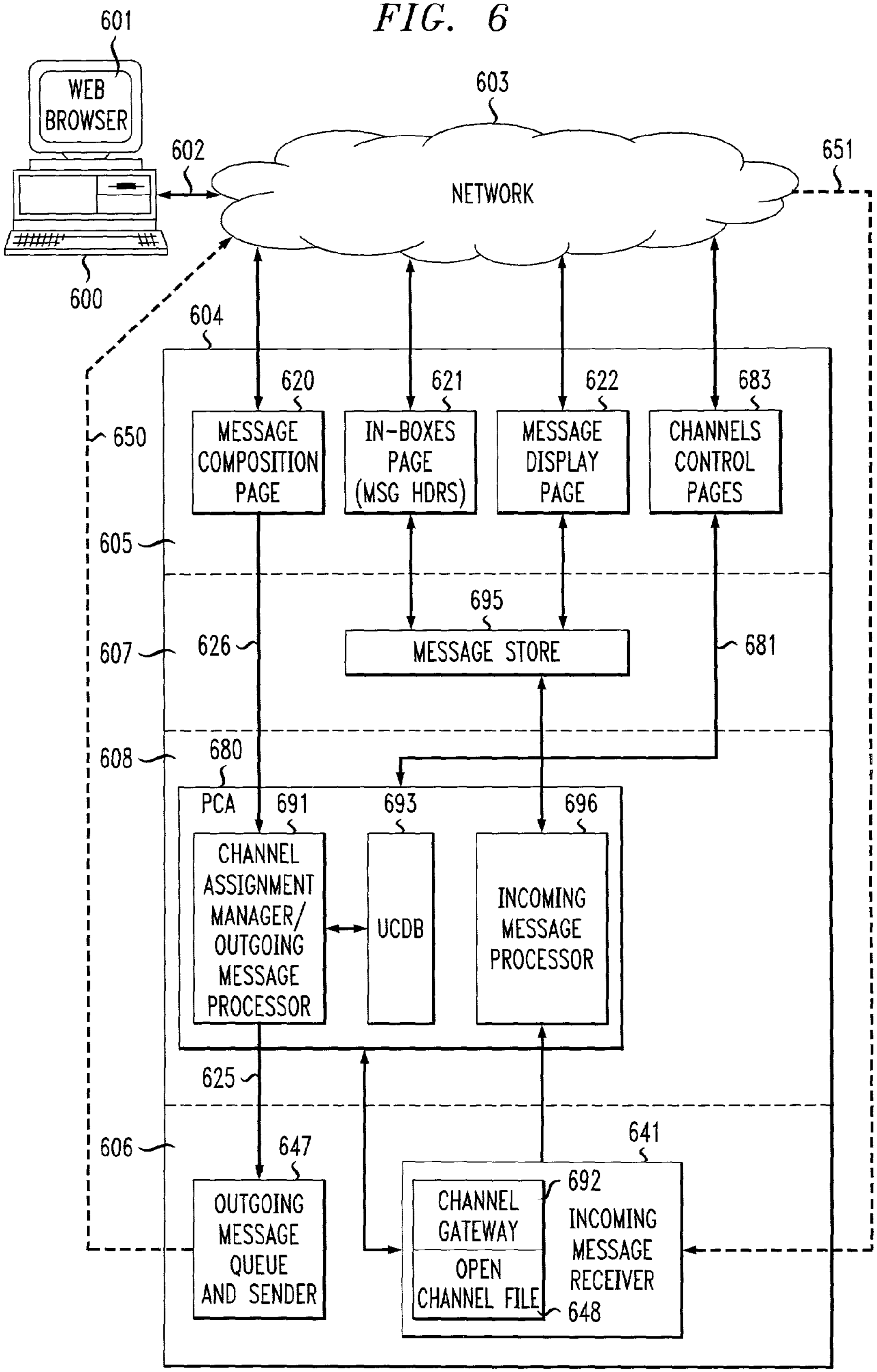
FIG. 6 is a block diagram illustrating a Web-based e-mail system according to the present invention.

FIG. 6 illustrates an example of a Web-based e-mail system in accordance with one embodiment of the invention. The system includes a Web-based server 604 communicating with a user machine 600 running client software such as a browser 601. Communications between the server 604 and user machine 600 are through a network 603 via a connection 602. The network may be any public or private computer network such as the Internet.

Communications between the server and user machine utilize a markup language in transmitting information through the network. A markup language is a language that allows the insertion of delimiting characters between other information to define how that information will be displayed. Markup languages permit the transmission of a variety of information types, including text, graphics, audio, video and executable routines. Examples of markup languages presently in use include Hypertext Markup Language (HTML), commonly used on the World Wide Web, Extensible Markup Language (XML), which permits an unlimited number of data types to be transmitted, and Wireless Markup Language (WML), for use with small wireless devices. Markup languages are specified using the Standard Generalized Markup Language (SGML) standard. As used herein, the term "markup language" is also intended to encompass any interface description formalism that permits combinations of programming languages, traditional markup languages and data formats to be transmitted and rendered. For example, a markup language might define a formalism using HTML plus Javascript plus GIF, or HTML plus Javascript, or XML plus plain text plus ActiveX control.

Markup languages are transmitted through a network using a network protocol that permits the rendering of the transmitted information using a markup language rendering tool such as a browser. The protocol enables a markup language rendering tool to display, play, execute or otherwise render the information delimited by the markup language in an intended form. Examples of network protocols include Hypertext Transfer Protocol (HTTP) and Wireless Application Protocol (WAP).

Information transmitted via a markup language is typically transmitted as one or more "pages." A page is a markup language file transmitted in response to a request. A markup language page may be displayed by itself, or may be displayed together with other pages using "frames" or another tool for rendering multiple markup language pages simultaneously.

Incoming e-mail messages (path 651) and outgoing e-mail messages (path 650) are transmitted via the network 603 using SMTP protocol or another mail transfer protocol. The server 604 transmits those messages to and from the user machine 600 via HTTP protocol as described below.

The Web-based mail server 604 contains a mail server 606, a network interface layer 605, a message storage layer 607 and a channel processing server 608. The network interface layer 605 of the Web-based mail server 604 comprises one or more email administration pages including a message composition page 620, an in-box display page 621 and a message display page 622 as described above. In addition to those email administration pages, the network interface communicates with the client machine 600 through one or more channel processing server control pages 683 that are used to set up and modify various aspects of the channel processing server 690 as described below.

The message store layer 607 contains a message store 695 for storage of messages including received messages, sent messages and draft messages. As is well known in the art, the message store may have a hierarchical file structure enabling a user to organize her messages according to subject matter, date or other criteria.

The channel processing server 608 of the Web-based mail server 604 includes one or more personal channel agents ("PCA's") 680 for performing the functions required for using and administering channelized email. Those functions and controls include, for example, opening and closing channels, managing the user channel database that maps a correspondent's address to its assigned channel, and mapping the channel assigned by a correspondent to the user.

Figure 1A:
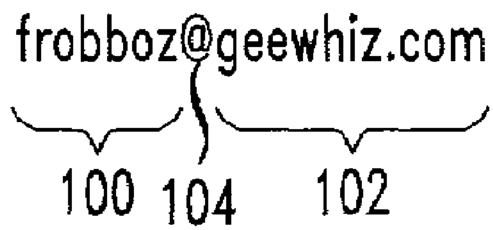
FIG. 1A is a diagram of a conventional e-mail address.
Figure 1B:
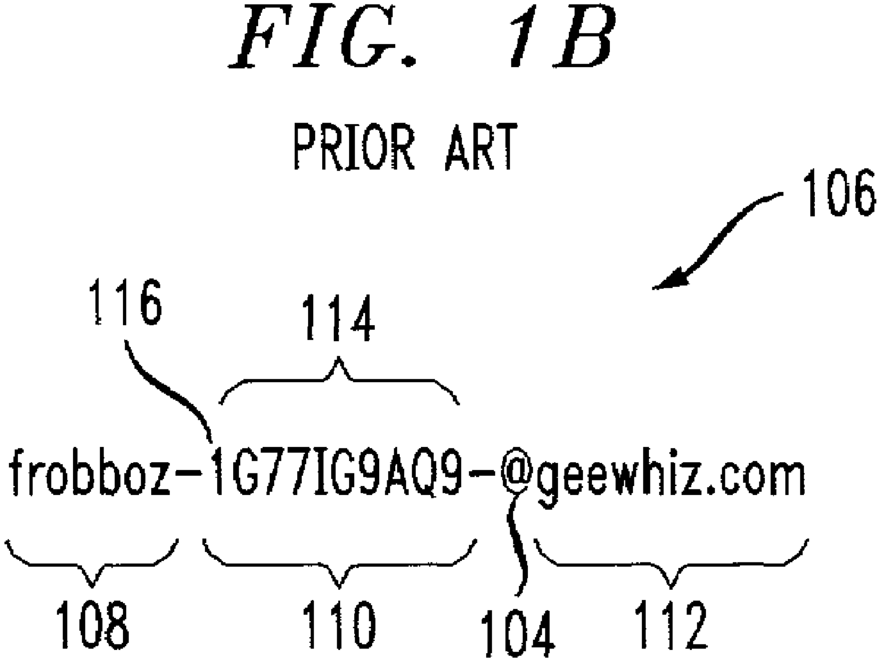
FIG. 1B is a diagram of a channelized e-mail address.
Figure 2:
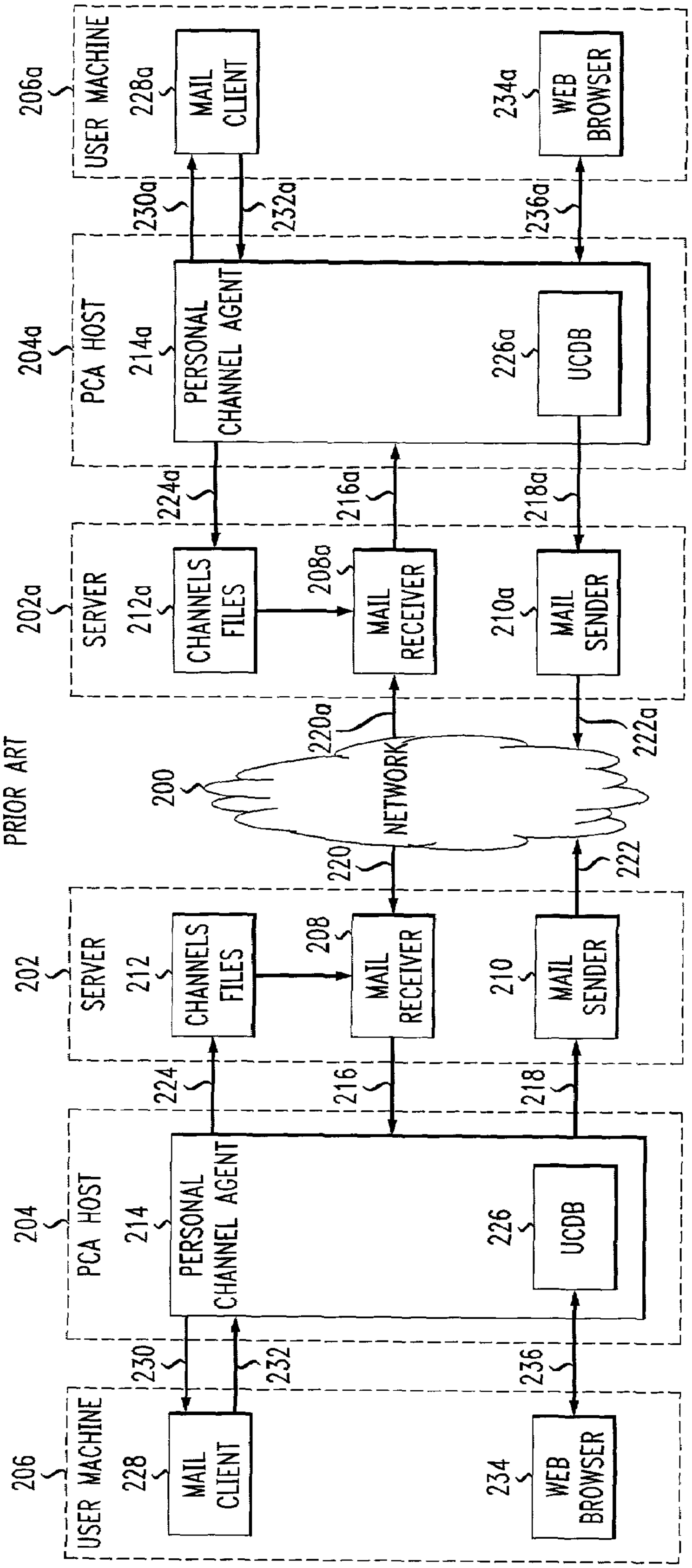
FIG. 2 is a block diagram illustrating a channelized e-mail system.

The PCA 680 includes a channel assignment manager/outgoing message processor 691, a UCDB 693 and an incoming message processor 696. The channel assignment manager/outgoing message processor 691 receives messages from the HTML message composition page 620 of the network interface layer 605, via path 626. Those messages may contain conventional e-mail addresses (FIG. 1A) identifying the intended message recipient in the network. The channel assignment manager/outgoing message processor 691 looks up the recipient's address in the UCDB. If the address is in the UCDB, indicating that the recipient is a known correspondent, the channel assignment manager places a corresponding channel ID from the "own channel" field (FIG. 3) of the UCDB in the return address of the message, and, if the recipient is also a channels user, places a channel ID assigned by the recipient ("correspondent channel") in the "to" address. If the recipient is not found in the UCDB, then the channel assignment manager/outgoing message processor 691 creates a new open channel ID and places it in the return address. If the message is addressed to multiple recipients, an individual version of the message containing only the recipient's channel address is sent to each recipient. In that way, the channel used to send to one recipient is not revealed to the other recipients. In any case, the channel assignment manager forwards the message with channelized address(es) to the outgoing message queue and sender 647 through path 625.

Figure 5:
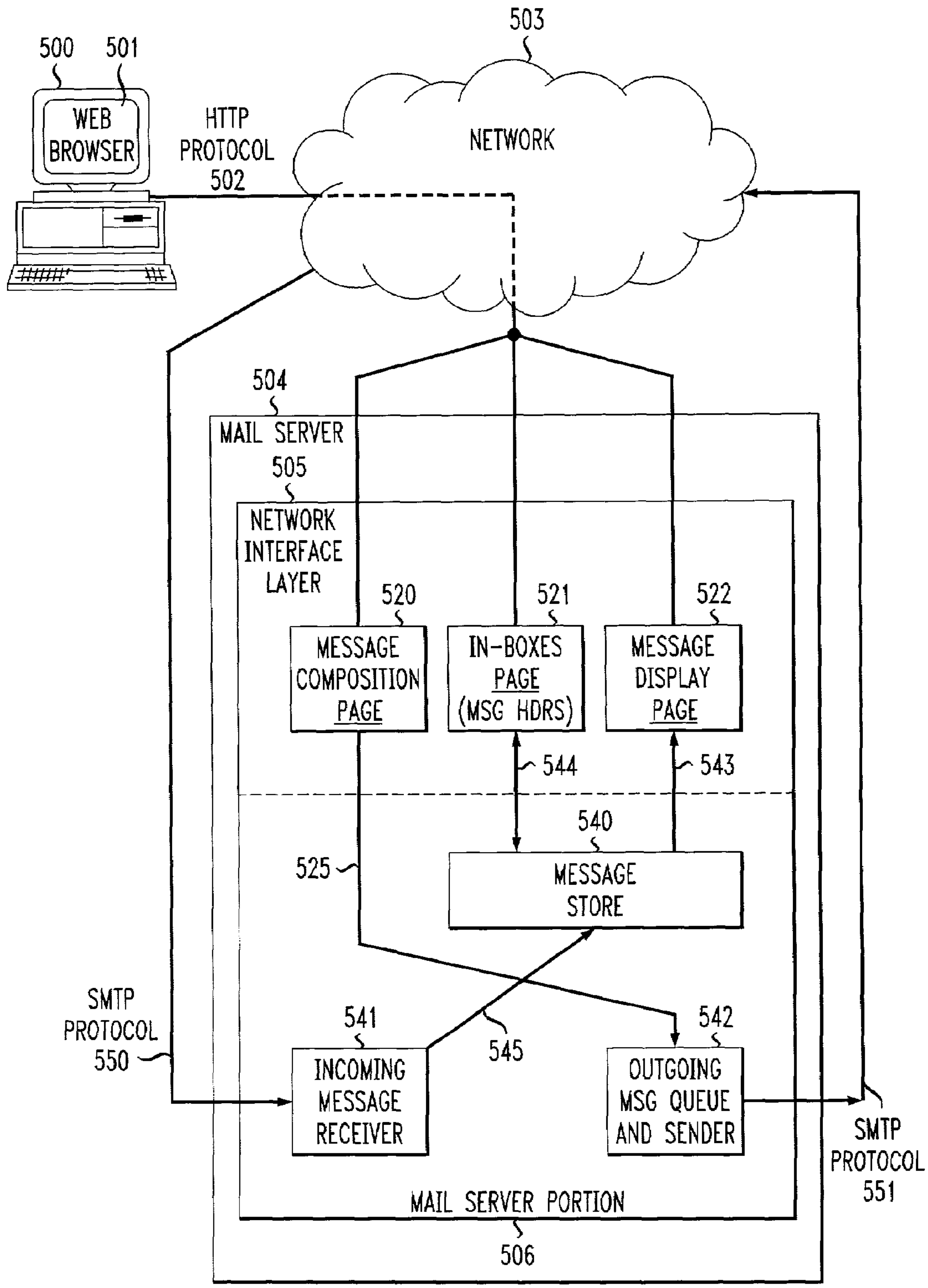
FIG. 5 is a block diagram illustrating a conventional Web-based e-mail system.

The incoming message processor 696 of the PCA performs user interface-related operations on the messages before forwarding them from the mail server 604 to the message store 695. Those operations may include, for example, removing the channels portion of the message addresses, decrypting messages that have been encrypted by other channels users, and verifying digital signatures that are contained in the messages. While the channel processing server 608 is illustrated as including an incoming message processor 696 for performing user interface-related functions, the channel processing server of the invention may alternatively contain only the basic functionality of the channel assignment manager/outgoing message processor 691, without other user interface functionality. In that case, additional functionality may be provided at the user machine or elsewhere, or may not be provided at all. The mail server 606 contains an incoming message receiver 641 and an outgoing message queue and sender 647 having functions similar to corresponding features of the known Web-based mail server described above with reference to FIG. 5. The incoming message receiver 641 furthermore includes a channel gateway 692 and open channel file 648 for controlling the flow of incoming messages through the mail server 606 based on a comparison of the addresses contained in the messages with data in the open channel file. If a message is addressed to an open channel, the message is transferred to the message store 695 via the incoming message processor 696 for viewing by the user. Only those messages having a valid channel address are forwarded to the message store. If the message is addressed to a closed channel, or contains no channel in the address, then the message is not transmitted beyond the mail server 606. A return message may be transmitted to the sender indicating that the address used by the sender is invalid or that the message is undeliverable.

Placing the channels gateway 692 in the mail server 606 allows for a distributed solution where one or more copies of the gateway reside on separate physical servers. The open channel file 648 contains a subset of the data contained in the UCDB 693 and the two databases are synchronized, for example, by sending control messages from the channel assignment managers 691 to the gateways 692 to update the open channel files. Alternatively, the channel gateway 692 may reside in the channels processing server 606, in which case the open channels file 648 is not needed because the gateway has direct access to the UCDB 693.

Figure 7:
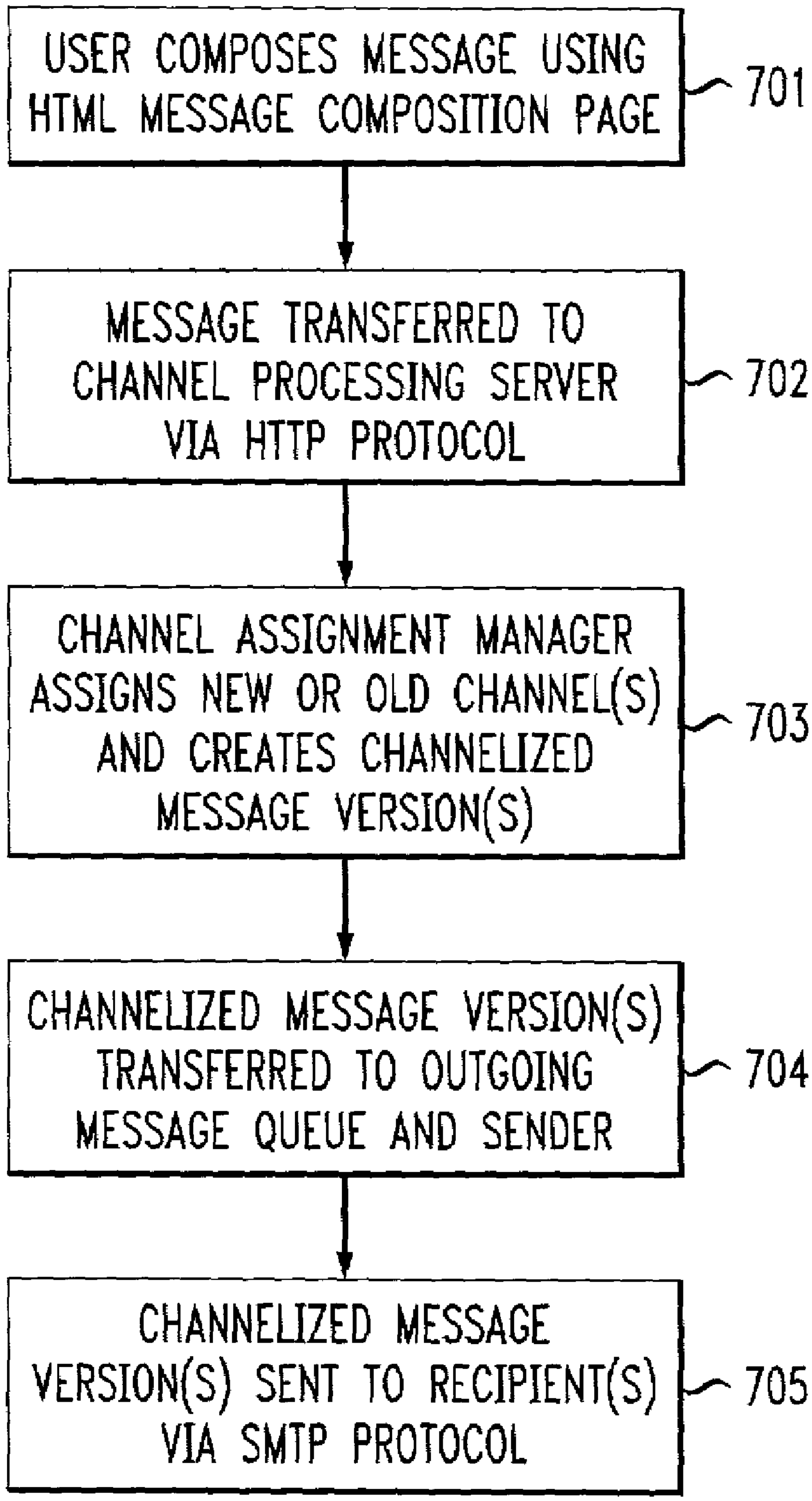
FIG. 7 is a flow chart representing a method of sending a message in accordance with the present invention.

In a method for sending an electronic message as shown in FIG. 7, a user first composes a message (step 701) using the message composition page 620 (FIG. 6). The message composition page may contain a blank HTML form, JavaScript menu and button selections, animation in the form of Java applets, or other useability enhancements. The message composition page is transmitted by the Web-based mail server 604 to the client 601 via the network 603. The user completes the message composition page 620 by entering data in fields such as a recipient address field, a message body field and a message title field. After the user has entered data in one or more of the fields provided in the message composition page, the user transmits the page over the network 603 via HTTP protocol to the Web-based mail server 604 where the message data is extracted and sent to the channel processing server 608 (step 702).

Once the data is received at the channel processing server, the channel assignment manager at step 703 either creates a new channel for incorporation in the address of a new correspondent, or looks up a currently opened channel for incorporation in the address of a known correspondent. New "channelized" message versions are created for each addressee to avoid disclosure of channels where multiple recipients are listed. The channel processing server may perform additional operations on the messages, such as encryption. The encryption key may be selected based on the channel used. The channelized message versions are then transferred to the mail server 606 (step 704) where the outgoing message queue and sender 647 sends the message versions (step 705) to the recipients via SMTP protocol.

Figure 8:
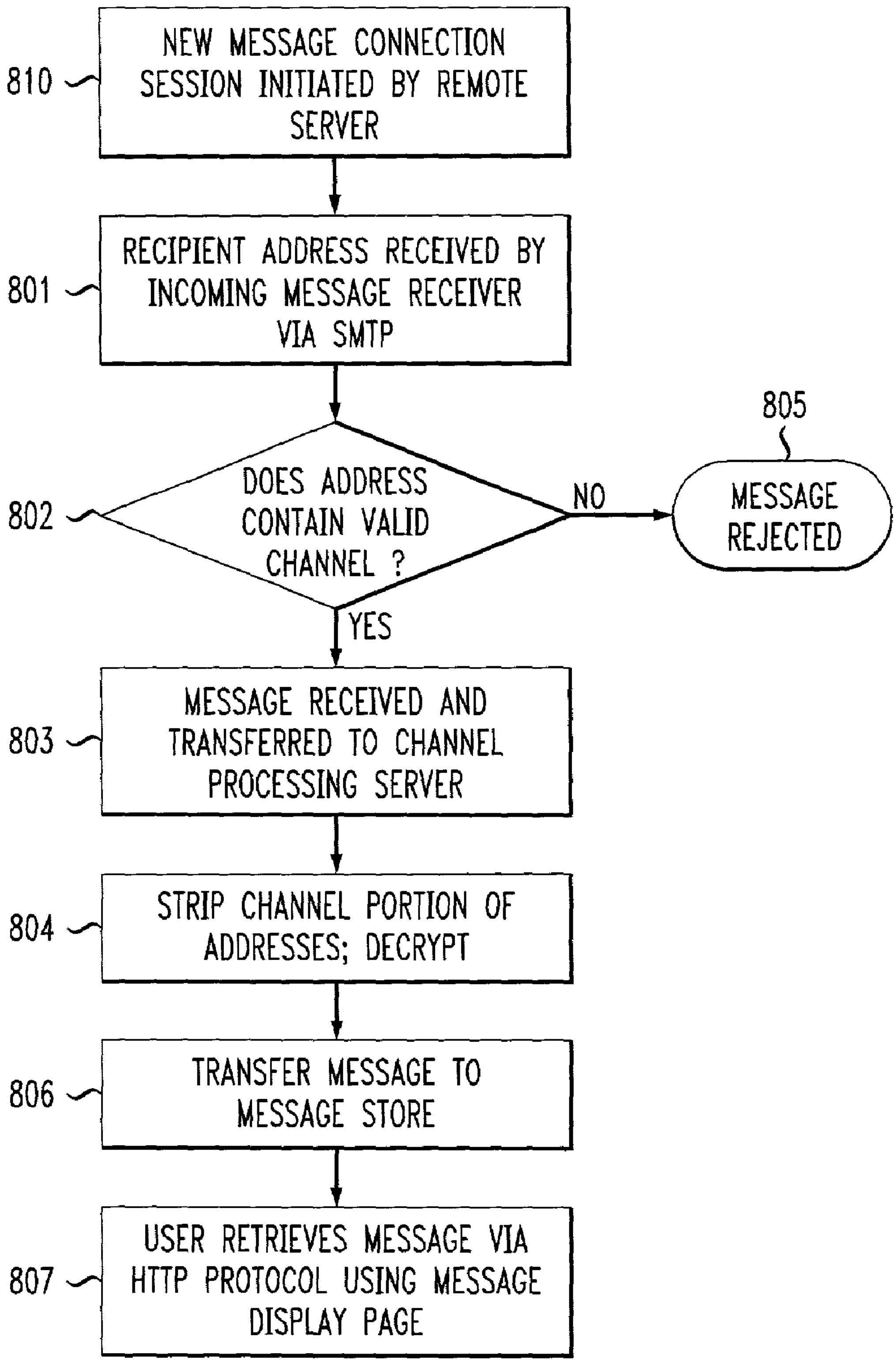
FIG. 8 is a flow chart representing a method of receiving a message in accordance with the present invention.

In a method for receiving a message in accordance with the invention, shown in FIG. 8, a new message connection session is initiated (step 810) between a remote server and the mail server 606 (FIG. 6). A recipient address of the new message is transmitted by the remote server via SMTP and is received in step 801 by the incoming message receiver 641 of the mail server 606. The channel gateway 692 of the incoming message receiver checks whether the message address contains a valid channel ID (step 802). If the message is addressed to an invalid channel, or if the address contains no channel ID, then the message is rejected (step 805). If the address contains a valid channel ID, the message is received by the incoming message receiver 641 and is transferred (step 803) from the mail server 606 to the incoming message processor 696 of the channel processing server 608. The incoming message processor may execute one or more preliminary functions (step 804) on the message before forwarding it. For example, the incoming message processor may strip the channel portions of the addresses from the message to make the message look and feel more like a standard message. Further, the incoming message processor may perform a decrypting operation if the message had been previously encrypted, and may verify a digital signature contained in the message. The message then is transferred to a message store 695 (step 806). The user retrieves the message from the message store using the message display page 622 (step 807).

Figure 9:
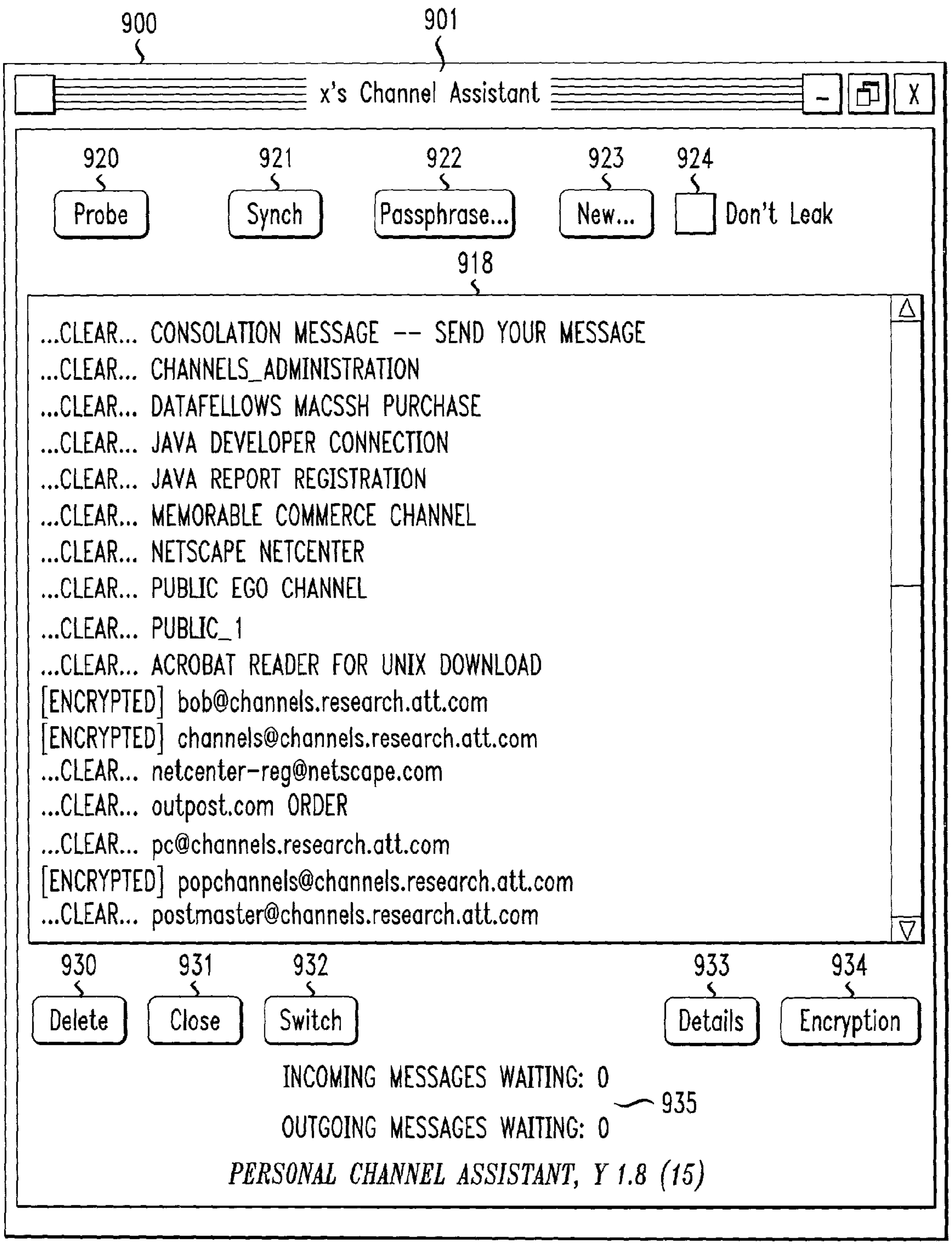
FIG. 9 is an illustration of a client user interface page for administering a PCA in accordance with the present invention.

When a user needs to perform functions for manipulating channels such as opening, closing, creating, deleting or switching channels, the user may use the PCA's administrative interface which is illustrated in FIG. 9. The administrative interface may be used to allocate some new channels (for example for use in mailing lists or as temporary reply channels) or to close or switch channels. This administrative interface is used with the Web browser 601 through path 602. A user accesses the administrative interface through the channels control pages 683 of the network interface layer 605 (FIG. 6).

Referring now to FIG. 9, an exemplary administrative interface 900 (shown as it would appear on a computer screen) provides a title 901 indicating the owner "x" of the UCDB 693 for which the interface has been accessed. The interface provides a way to view and modify the UCDB 693, which holds most of the relevant data used by the PCA 680 for a given system user. The interface provides a channel map display 918, notices 935 of incoming and outgoing messages waiting, and various buttons for manipulating PCA data as described below. The buttons are displayed on the computer screen and are selected by a user with a pointing device such as a mouse or trackball.

The buttons 920 through 924 are positioned above the channel map display 918 and are general function buttons that do not apply to any one specific channel. For example, when the PROBE button 920 is selected, the mail server is immediately checked for new messages. That function is typically performed automatically on a periodic basis; the PROBE button permits checking without waiting for the next automatic cycle.

A SYNCH button 921 is provided to synchronize the open channels file with the UCDB. Like the PROBE function, the SYNCH function is carried out periodically by the PCA. A user, however, may wish to update the open channels file without waiting, in order to implement changes made to the UCDB immediately. The SYNCH button causes the PCA to send a control message to the channels gateway to synchronize the open channels file with the UCDB.

The PASSPHRASE button 922 allows a user to input or change a security passphrase that is used in encrypting the user's information stored on local or publicly accessable storage. In that way, all user-specific information is encrypted when stored, and is only in clear form when placed in volatile memory.

A new channel may be opened manually using the NEW button 923. When manually opening a channel, a user enters the standard email address(es) of the correspondent(s) authorized to use the channel. The user may also enter a name or description of the channel for display in the channel map display 918. A user may have the ability to open a new channel with a particular user-chosen channel identifier string, making it easier for correspondents to remember. New channels are also created automatically when the user sends a message to a new recipient.

The "Don't Leak" checkbox 924 prevents channel addresses from being disclosed or "leaked" among multiple recipients of a single message. It has been found by the inventor that it is often preferable to permit channel addresses to be disclosed to multiple correspondents named in a message to permit responses to be sent to the group without creating individual channel addresses for each sender/receiver combination in the group. This feature may be turned off by using the "Don't Leak" button under circumstances where some or all of the correspondents are suspect.

Buttons 930 through 934 are located beneath the channel map display 918 and are used to perform functions on individual channels selected from the display. A channel is selected from the display using a pointing device such as a mouse. In the display shown in FIG. 10, the fourth channel 1010 of the display 918, entitled, "Java Developer Connection," has been selected.

A DELETE button 930 (FIG. 9) is provided to remove all information about a selected channel from the UCDB, and to send a message to the channel gateway 692 (FIG. 6) to remove the selected channel from the open channel file 648. After a channel has been deleted, it cannot be reopened because no information about that channel is available to the PCA.

A CLOSE button 931 closes a selected channel to incoming messages, but retains information about that channel in the UCDB. The closed channel continues to be displayed in the channel map display 918, where a notation indicated that the channel is closed. No incoming messages are accepted through a closed channel. Closed channels may be reopened.

The SWITCH button 932 is used to move a correspondent to a new channel. That is done most often when the original channel used by that correspondent has been compromised. The SWITCH button allocates a new channel, closes the original channel and informs the correspondent that the switch was made. Where the correspondent is also a channels user, a command is sent to the correspondent's PCA changing the channel ID for messages sent by the correspondent to the user. If the corresponedent is not a channels user, then the user's PCA sends a human-readable message to the correspondent informing the correspondent that the channel ID of the user has changed, and instructing the correspondent to manually change the address of the user in the correspondent's directory.

Figure 10:
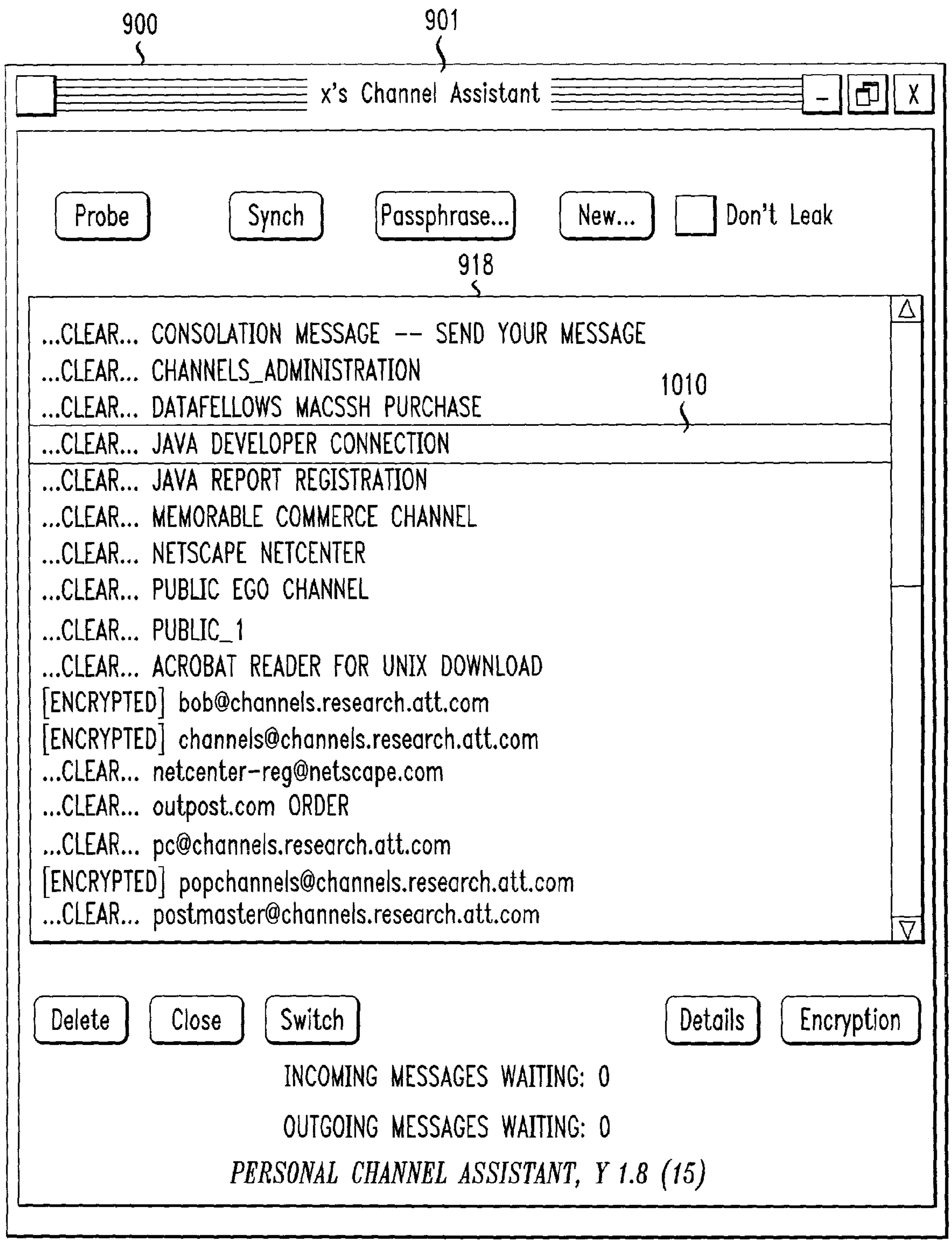
FIG. 10 is another illustration of a client user interface page for administering a PCA in accordance with the present invention.
Figure 11:
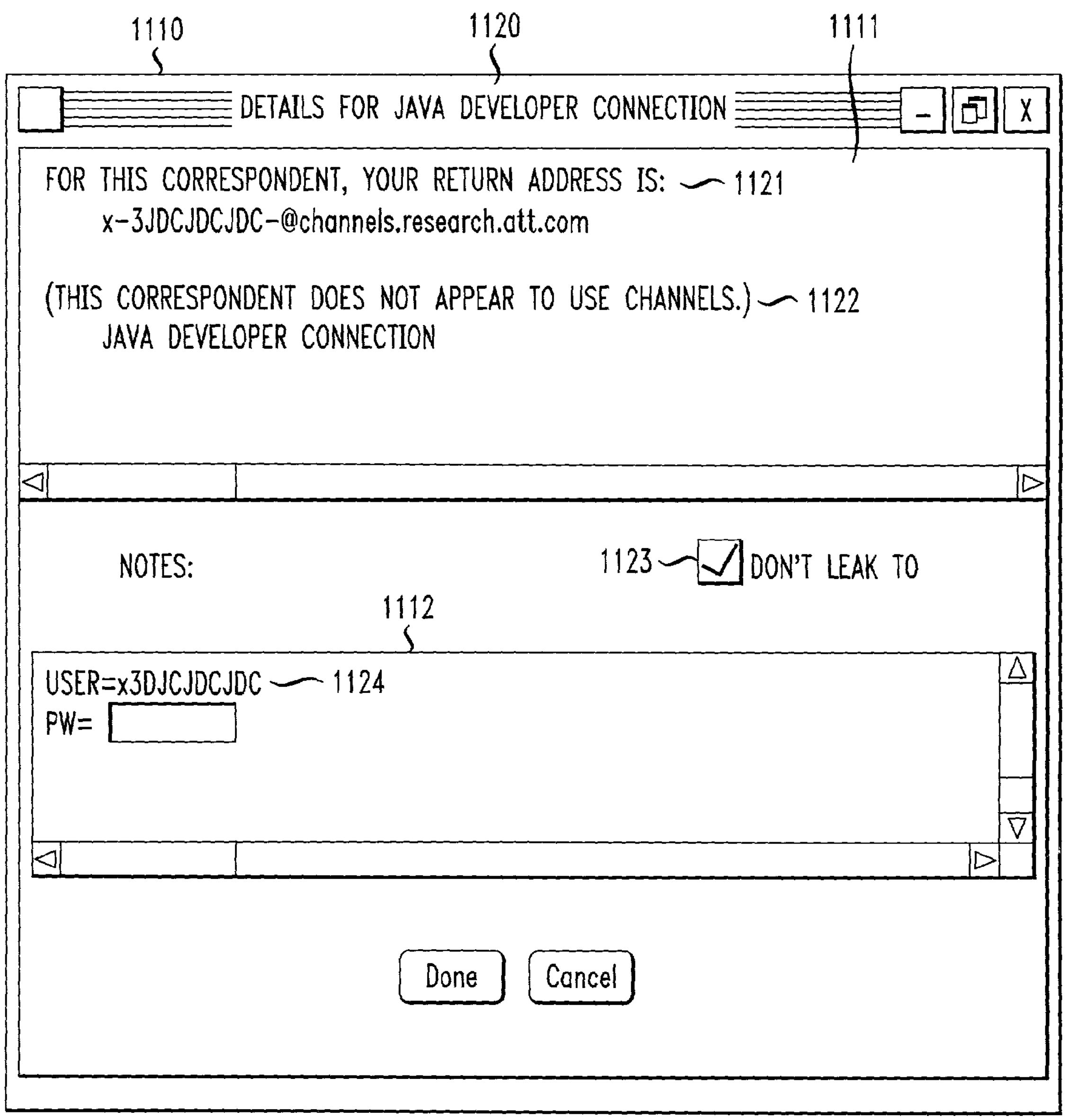
FIG. 11 is an illustration of a client user interface page showing detailed information about a channel.

A DETAILS button 933 displays additional information about a selected channel. For example, details of the channel selected in FIG. 10 are shown in a display 1110 of FIG. 11. The name of the channel "Java Developer Connection" as it appeared in the channel map display 819 is provided in a title block 1120. The channels address 1121 "x-3JDCJD-CJDC-@channels.research.att.com", including the channels ID, is displayed in an upper pane 1111 of the display 1110. The upper pane 1111 also contains a channels address of the correspondent using the selected channel, if available. In the particular case illustrated in FIG. 11, it is noted in notation 1122 that the correspondent is not a channels user.

A lower pane 1112 of the display 1110 contains notes manually input by the user that apply to the selected channel or its associated correspondents. In the illustrated example, a user ID 1124 and password required for access to the correspondent are recorded for the user's convenience. Additionally, a "Don't Leak To" checkbox 1123 applies specifically to the correspondent(s) using the selected channel. When the box is checked, no channel ID's other that the channel ID assigned to the selected channel will be disclosed to the correspondent. The checkbox 1123 overrides not checking the general "Don't Leak" checkbox 924 appearing in the administrative interface (FIG. 9).

An ENCRYPTION function 934 is provided to allow the user to specify a key for encrypting messages sent to and from a channels-using correspondent on a selected channel. The key is separately (manually) transmitted by the user to the correspondent. Once set up, encryption and decryption of messages are conducted automatically by the PCA, and are transparent to the user.

The channel map display 918 contains a list of open and closed channels specific to the PCA. The channels may be scrolled up and down using the scroll bar 919, as is known in the art. The first through the tenth and the fourteenth channel names displayed in display 918 are names that have been manually entered using the NEW button 923. Those names were chosen and manually typed by the user. The remaining channel names are displayed as standard email addresses; those channels were created by sending an email to a new correspondent. The standard email addresses of the correspondents were automatically assigned as channel names, and may be changed or edited by the user, if desired. In either case, for each channel, the display provides a unique name that is an identification of a correspondent or group of correspondents who are authorized to send the user messages using that corresponding channel. The channel names may be edited by the user for convenience. The display also indicates for each channel whether the channel is encrypted or is clear.

Figure 12:
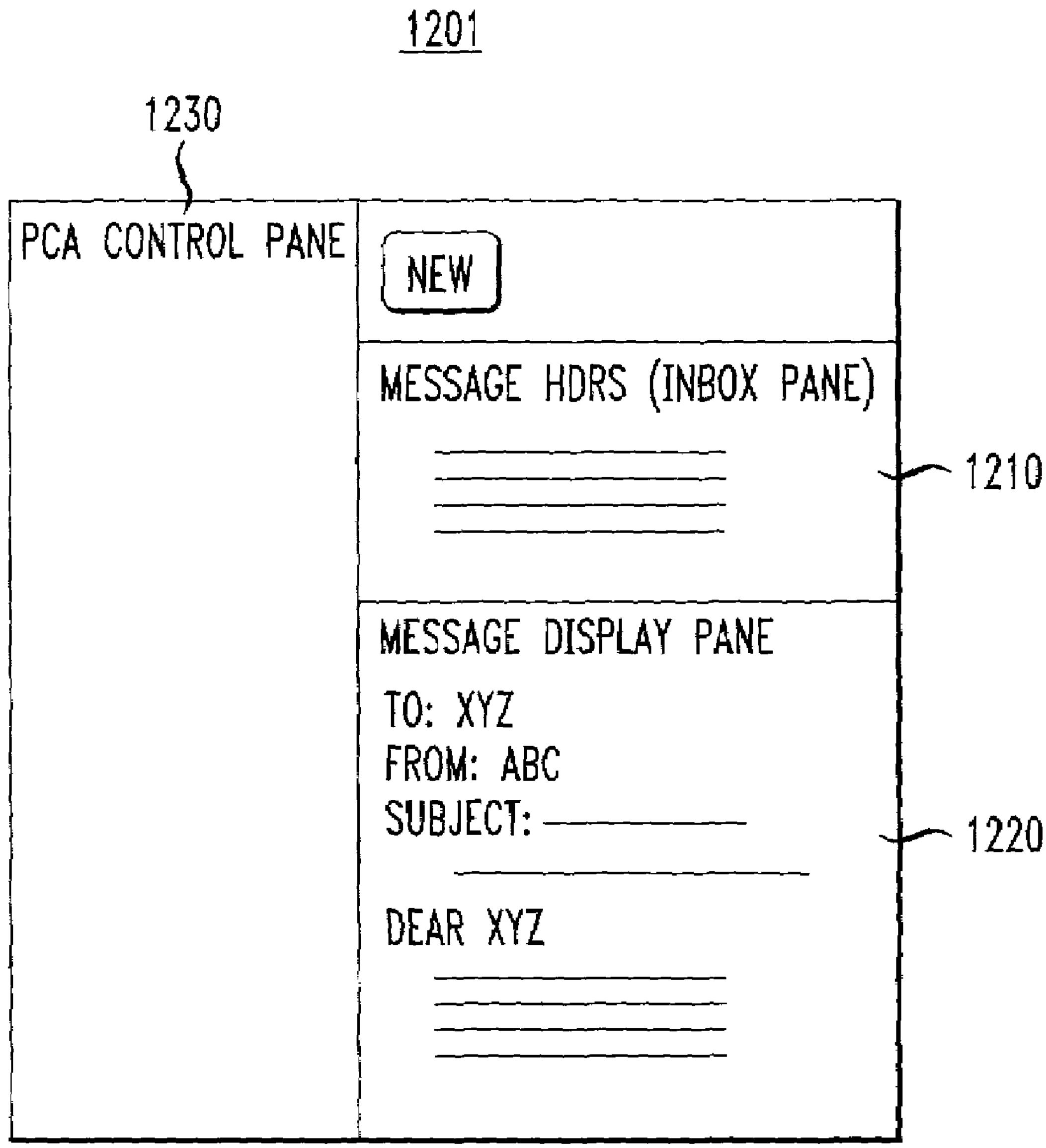
FIG. 12 is a diagram illustrating a client user interface page for use with a channelized Web-based e-mail system according to the present invention.

FIG. 12 shows an example of a mark-up language display 1201 that may be used for the transfer of information between a client and the Web-based mail server 604 (FIG. 6) of the invention. The display 1201 contains three panes: an in-box pane 1210, a message display pane 1220 and a channel processing server control pane 1230. Because control of the channel processing server and transfer of messages between the Web-based mail server and the client both utilize a protocol such as HTTP or WAP, it is efficient to present both user interfaces in the same window.

The inbox pane 1210 and message display pane 1220 present information regarding received messages as is known in the art. For example, the inbox pane may display "to" or "from" addresses, as well as non-address information from the headers of the messages such as the date and subject lines. The channel processing server control panel 1230 is an administrative interface enabling the user to perform various channel-related functions as described above with reference to FIGS. 9–11. The control panel 1230 may include a display of the available channel names, as described with reference to FIG. 11. Those functions performed by the control panel 1230 include closing a channel (i.e., disallowing the receipt of further messages on that channel) and switching a channel (i.e., notifying an intended correspondent to use a new channel while simultaneously opening the new channel and closing the old channel). The channel processing server control panel may present a text-based note document corresponding to a particular channel or correspondent, giving the user the ability to annotate the database. If the e-mail system has encryption capabilities, the control panel may allow the user to turn on or off encryption on a particular channel.

In the system and method of the present invention, e-mail and e-mail administration is transmitted to and from the user in the same protocol (HTTP or another such markup transfer protocol) as the channels administration pages, making it convenient and efficient to present information derived from both sources to the user in the same user interface window. By presenting the e-mail administration panes side-by-side with the channel administration pane, the system allows a user to easily recognize which channel to close when a spam message is received and to decide whether to switch that channel or simply to close that channel. The two panes may interact in order to facilitate such decisions. For example, when a message is selected in the e-mail administration pane, the channel through which that email was received may be highlighted in the channel administration pane.

A user can access his annotations for a given channel that may help in answering a question or in deciding how to treat a particular message received on that channel. By having message content available while using the channel administration pages, the user can create a new channel for a particular use (such as for use by all members of a cat-lovers interest group) in order to include it in a message. Moreover, the well-known features of email address books (such as the ability to define nicknames and lists of correspondents) can be advantageously combined with the channel-related information and functionality, so that a user can create simple nicknames for correspondents and groups that can be used in addressing messages.

Because the channels processing server, including all data that must be accessed by the channels processing server, is located at a Web-based mail server, a user is able to access his channels-protected mail from any machine that has a browser and is connected to the network. No special channels software is required at the client location, and the user-specific channels data such as that contained in the UCDB database is accessible via the channel processing server control pages 683, and so need not be stored at the client location.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description describes an embodiment of the invention with particular reference to electronic mail. However, the principles of the present invention could be readily extended to telephony. Such an extension could be readily implemented by one of ordinary skill in the art given the above disclosure.

I claim:

1. A server for handling messages transmitted to and from a plurality of clients over a network, the messages having addresses attached to them, the server comprising:

a network interface for communicating with the clients by transferring a markup language using a network protocol;

a mail server for sending and receiving messages over the network;

a channels assignment manager for assigning channel identifiers to be used as parts of the addresses;

a channels gateway for determining whether messages are authorized messages based upon said channel identifiers;

a personal channel agent for administering channels;

wherein the network interface comprises at least one channel control page for transmission to and from said client allowing the client to access the personal channel agent and at least one email administration page for transmission to and from said client; and wherein at least one of said channel control pages and at least one of said email administration pages are transmitted to the client as a single markup language page.

2. A server for handling messages transmitted to and from a plurality of clients over a network, the messages having addresses attached to them, the server comprising:

a network interface for communicating with the clients by transferring a markup language using a network protocol;

a mail server for sending and receiving messages over the network;

a channels assignment manager for assigning channel identifiers to be used as parts of the addresses;

a channels gateway for determining whether messages are authorized messages based upon said channel identifiers;

wherein the network interface comprises at least one channel control page for transmission to and from said client allowing the client to access the personal channel agent and at least one email administration page for transmission to and from said client; and wherein at least one of said channel control pages and at least one of said email administration pages are transmitted to the client as a single markup language page.

* * * * *

US006993574C1

(12) EX PARTE REEXAMINATION CERTIFICATE (7503rd)

United States Patent

Hall

(10) Number: US 6,993,574 C1

(45) Certificate Issued: May 11, 2010

(54) WEB-BASED COMMUNICATIONS ADDRESSING SYSTEM AND METHOD

(75) Inventor: Robert Hall, Berkeley Heights, NJ (US)

(73) Assignee: Winstate Investments Limited, LLC, Wilmington, DE (US)

Reexamination Request:
No. 90/008,838, Sep. 7, 2007

Reexamination Certificate for:
Patent No.: 6,993,574
Issued: Jan. 31, 2006
Appl. No.: 09/884,646
Filed: Jun. 19, 2001

(51) Int. Cl.
*G06F 15/16* (2006.01)

(52) U.S. Cl. ........................................ 709/219; 709/207

(58) Field of Classification Search ......................... None
See application file for complete search history.

(56) References Cited

U.S. PATENT DOCUMENTS

| | | | |
|---|---|---|---|
| 5,555,346 | A | 9/1996 | Gross et al. |
| 5,627,764 | A | 5/1997 | Schutzman et al. |
| 5,717,860 | A | 2/1998 | Graber et al. |
| 5,742,771 | A | 4/1998 | Fontaine |
| 5,822,526 | A | 10/1998 | Waskiewicz |
| 5,930,479 | A | 7/1999 | Hall |
| 5,999,967 | A | 12/1999 | Sundsted |
| 6,185,551 | B1 | 2/2001 | Birrell et al. |
| 6,266,692 | B1 | 7/2001 | Greenstein |
| 6,546,416 | B1 | 4/2003 | Kirsch |
| 6,708,205 | B2 | 3/2004 | Sheldon et al. |
| 6,725,269 | B1 | 4/2004 | Megiddo |
| 6,760,752 | B1 | 7/2004 | Liu et al. |
| 7,054,906 | B2 | 5/2006 | Levosky |
| 2002/0023135 | A1 | 2/2002 | Shuster |
| 2002/0024538 | A1 | 2/2002 | Kahan et al. |

OTHER PUBLICATIONS

Journal of Computing, vol. 15 No. 2 p. 364 (May 1966).
Borenstein, et al., Power, ease of use and cooperative work in a practical multimedia message system, Int'l J. Man–Machine Studies 34(1) 229–259 (1991).
Dusse, S/MIME Message Specification, RSA Data Security Inc. (Sep. 1996).
Dusse, et al., S/MIME: Anatory of a Secure E–Mail Standard, RSA Data Security Inc., printed from http://www.e-ma.org/html/pubs/mmv2n4/s–mime.htm on Oct. 18, 1996, original publication date unknown.
Myers, et al., Request for Comments 1725, Post Office Protocol—Version 3, University of California at Berkeley. Http://cobweb.berkeley,Edu/web/Hypertext/popper/rfc1725.txt (Nov. 1994).
RSA Data Security, Inc.: S/MIME Implementation Guide, Interoperability Profile, Version 1, S/MIME Editor, ftp: ftp.rsa.com/pub/S–MIME/smimeimp.txt (Aug. 1995).
RSA Data Security, Inc.: S/MIMECentral. Retrieved from the web, http://www.rsa.com/rsa/S–MIME on Oct. 18, 1996; original publiction date unknown.
Schiller, Mit distribution site for PGP, http://web.mit.edu/network/pgp.html (Sep. 4, 1996).
University of California at Berkeley: popper–1.831 beta README file, http://avalon.phys.hokudai.ac.jp/pub/hp..–1831/betta/popper.–1.831beta.README.html (1991).

(Continued)

*Primary Examiner*—Mary Steelman

(57) ABSTRACT

A system and method is provided for sending and receiving authorized messages from a sender to a recipient in a network utilizing a Web-based mail server. The Web-based mail server communicates with a user via HTML or another general purpose language. The mail system makes use of a channelized address to send the message from the sender to the recipient. The channelized address comprises a common address portion that indicates the identity of the recipient in the network and a channel identifier portion for verifying that the message is authorized for delivery to the recipient.

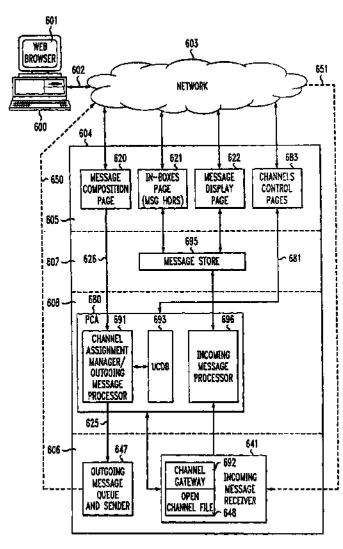

OTHER PUBLICATIONS

University of California at Berkeley: popper Maintenance Procedures, http://ptolemy.eecs.berkeley.edu/cgi–bin/man?popper (Aug. 1990).

Kent, RFC 1422, "Privacy Enhancement for Internet Electronic Mall: Part II: Certificate–Based Key Management," Internet Engineering Task Force, Feb. 1, 1993, pp. 1–32.

Blum, et al., A Simple UnpredicatablePseudo–Random Number Generator. SIAM Journal on Computing, vol. 15, No. 2, pp. 364–383, May 1986.

Ingersoll, et al. Pascale (Young Conaway Stargatt & Taylor, LLP) and Paul K. Vickrey, Douglas M. Hall, and Frederick C. Laney (Niro, Scavone, Haller & Niro): Complaint for Patent Infringement, Dated Feb. 21, 2006, titled *Zoetics, Inc. and Zoemail, LLC, Plaintiffs,* v. *Yahoo! Inc.* Defendant, (4 pages).

Costales, et al., Sendmail, pp. 1–40, 269–286 (1st Ed. 1993) (with minor corrections through Feb. 1994), 41 pages (Exhibit F).

Crocker, (Aug. 13, 1982) "Standard for the Format of ARPA Internet Text Messages." Department of Electrical Engineering, University of Delaware. Retrieved from the Internet; URL <http://www.ietf.org/rfc/rfc0822.txt?number=822>, retrieved on May 15, 2006, 46 pages (Exhibit M).

Eastlake, D.III, et al., The Etymology of Foo, (Apr. 1, 2001) available at http://www.ietf.org/rfc/rfc3092.txt and retrieved on Mar. 18, 2009 13 pages (Exhibit I).

Flames, Help, Copyright 1992 by Carnegie Melton University and IBM, retrieved from the Internet: URL <http://asg.web.cmu.edu/People/AUIS/ftp/src/ams/flames.help, retrieved on May 12, 2006, modified no later than May 26, 1994, 10 pages (Exhibit B1).

Menddelson, et al. E–Mail: Building the Perfect In–Box. (Oct. 8, 1996) PC Magazine, pp. 183–204, 12 pages (Exhibit L).

Rosenberg, et al. An Overview of the Andrew Message System: A Pportable, Distrubuted System for Multi–media Electronic Communication. Proceedings of the ACM Workshop on Frontiers in Computer Communications Technology, 99–108 (ACM Press), 10 pages (Exhibit K), Jul. 1987.

Portions of qmail–0.72 shar shell archive (Mar. 26, 2006), printed on Friday, Apr. 21, 2006; available at http://ftp4.de.freesbie.org/pub/misc/qmail/ (index (4 pages); "blurb" (1 page); "qmail–alias(8)" (3 pages); "qmail–header(5)" (3 pages); "qmail–inject(8)" (2 pages).

Flames Programmers Guide. Copyright 1992 by Carnegie Mellon University and IBM, 105 pages (Exhibit C).

Flames Programmers Guide, Copyright 1992 by Carnegie Mellon University and IBM, received from Internet: URL, http://www.cs.cmu.edu/People/AUIS/ftp/src/ams/flames/flames.pgr>, retrieved on Feb. 28, 2006, modified no later than May 26, 1994, 88 pages (Exhibit C1).

Business Wire, E–mail Security Becomes a Reality on the World Wide Web—Software.com Inc. Announces First Web Administered Server–Based E–mail Product with Unprecendented Ease of Use, Security Innovation. Business Wire, Inc., Distribution to Business Editors & High–Tech Industry Writers (Oct. 30, 1995), 2 pages (Exhibit N).

Index of/People/AUIS/ftp/src/ams/flames, retrieved from the internet: URL <http://www.cs.cmu.edu/People/AUIS/ftp/src/ams/flames/> retrieved on Feb. 28, 2006, (1 page).

Allman, New Sendmail Configuration Files. (Sep. 15, 1995) 29 pages.

Glickstein, Flames: Filtering Language for the Andrew Message System. Carnegie Mellon University and IBM. Retrieved from the Internet: URL <http://asg.web.cmu.edu/sieve/flames.html> retrieved on May 15, 2006, 8 pages.

"WebMail User's Manual." (Archived May 19, 2000). Retrieved from archive on Jun. 1, 2007. Archived at <http://web.archive.org/web/20001211232500/netwinsite.com/webmail/webmail_user.htm>. 11 pages.

"WebMail: Web Based Mail. Installation and Management Guide." (Archived May 19, 2000). Retrieved from archive on Aug. 1, 2007. Archived at <http://web.archive.org/web/20001211223200/netwinsite.com/webmail/webmail.htm>. 27 pages.

"WebIMAP/WebMail Gallery!!" (Archived May 19, 2000), Retrieved from archive on Jun. 14, 2007. Archived at <http://web.archived.org/web/20000823185525/netwinsite.com/webimap/gallery.htm>. 4 pages.

"Frames (HTML 4.01 Standard, Ch. 16)"(Archived May 20, 2000). Retrieved from archive on Jun. 1, 2007. Located at <http://www.w3.org/TR/html401/present/frames.html> and archived at <http://web.archive.org/web/20000816154950/www.w3.org/TR/html4/present/frames.html>. 13 pages.

"www.hotmail.com; HoTMaiL Provides Web–Based free Email To The World On Independence Day," (Jul. 1, 1996). Business Wire, Fremont, CA 2 pages.

Provisional Application No. 60/269,284, "Method for and System of Creating a Personal Electronic Messaging Domain" filed on Feb. 15, 2001 for Valentine Sheldon, incorporated by reference in U.S. Pat. No. 6,708,205.

Borenstein, et al. (1991), Power, Ease of Use and Cooperative Work in a Practical Multimedia Message System. 34 Int. J. Man–Machine Studies 229–259, 31 pages (Exhibit A).

Business Wire, www.hotmail.com: HoTMaiL Provides Web–Based Free Email to the World on Independence Day. (Jul. 1, 1996) Business Wire, Inc., Distributino to Busienss Editors and Computer Writers, 2 pages (Exhibit H).

QMail Distribution 0.72 (portions) obtained from q–mail–0.72.shar shell archive, last modified on Feb. 12, 1996 and retrieved from the Internet: URL <http://ftp4.de.freesbie.org/pub/misc/qmail/> [portions referenced are "index" (4 pages): "blurb" (1 page); "qmail–alias(8)" (3 pages);"qmail–inject(8)" (2 pages)], 13 pages (Exhibit E).

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1 and 2 are cancelled.

* * * * *